May 6, 1958 G. F. MARRIETTE 2,833,299
VALVE DEVICES FOR CONTROLLING THE FLOW OF FLUIDS
Filed May 3, 1954
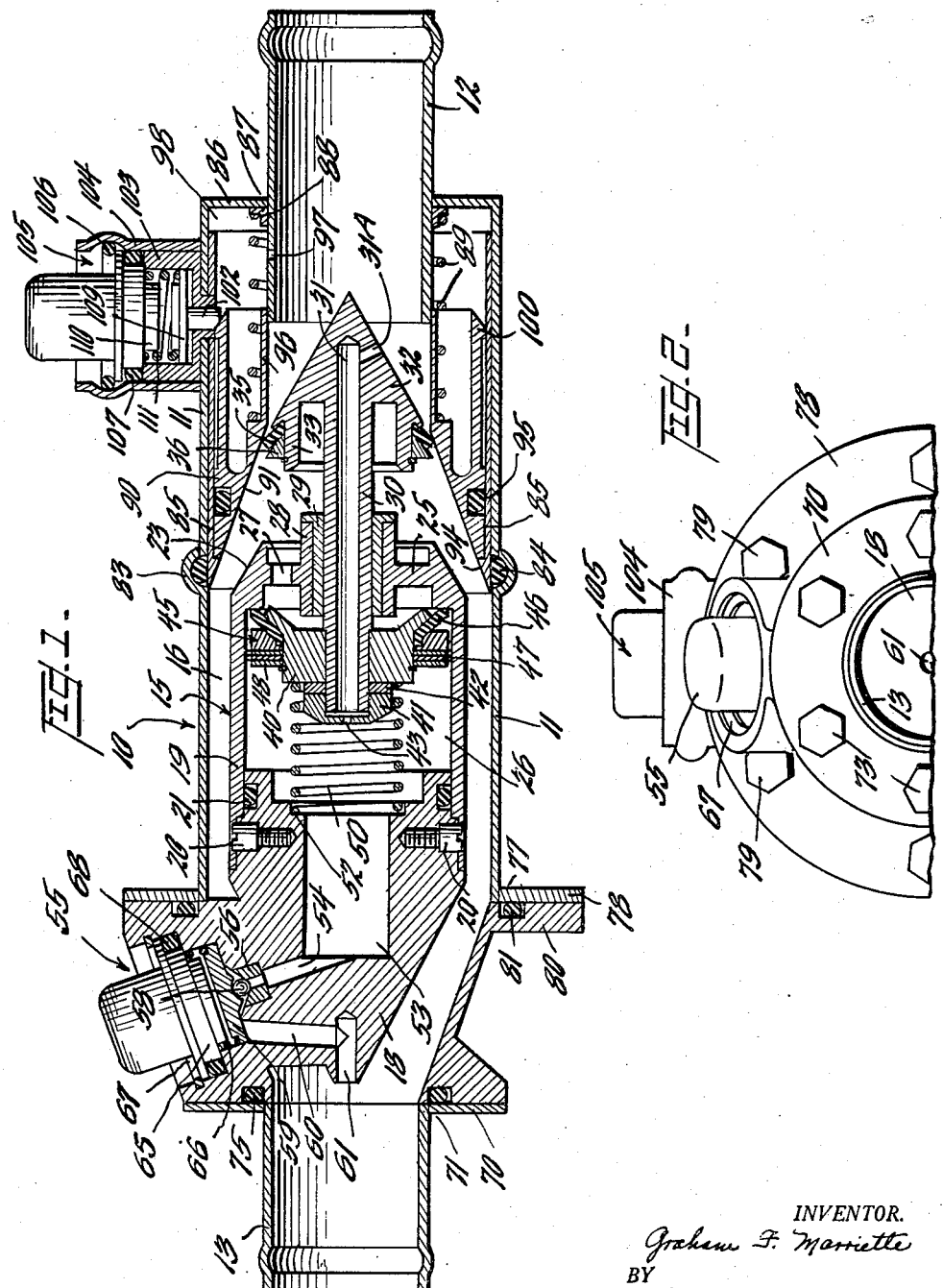
INVENTOR.
Graham F. Marriette
BY
Watson, Cole, Grindle &
Watson
ATTORNEYS United States Patent Office 2,833,299
Patented May 6, 1958

2,833,299

VALVE DEVICES FOR CONTROLLING THE FLOW OF FLUIDS

Graham Frederick Marriette, Blandford, England, assignor to Flight Refueling Incorporated, Baltimore, Md., a corporation of Delaware Application May 3, 1954, Serial No. 427,101

Claims priority, application Great Britain May 7, 1953

10 Claims. (Cl. 137—221)

This invention relates to valve devices for controlling the flow of fluids, and more particularly to a valve device of the kind in which a main valve, of the non-return type, is held closed, against fluid pressure acting on it in a direction tending to open it, by the action of said fluid pressure on a piston, diaphragm of the like having a larger effective area than the main valve, the said piston, diaphragm or the like being housed in a cylinder or chamber having a restricted communication with the side of the main valve on which the pressure acts to open it, and a pilot-valve-controlled connection with the other side of the main valve, so that opening of the pilot valve releases the pressure in the cylinder or chamber, and allows the main valve to open, and closing of the pilot valve results in closing of the main valve.

The general object of the invention is the provision of a novel and improved valve device of the class described.

A more particular object of the invention is to provide means for permitting flow of fluid in the opposite direction through such a valve device.

The invention in its preferred embodiment contemplates the provision of a main valve which cooperates with a seat on an annular member slidable in the direction of movement of the main valve to a position such that the said main valve is unable to engage the said seat, the said annular member being urged to that position by a pressure differential across the valve device in a direction to urge the main valve on to its seat, and latch means being provided to retain the annular member in the position in which the seat is engageable by the main valve. The opening of the pilot valve and the release of the latch means are conveniently effected by solenoids.

Other objects and features of novelty will be apparent from the following specification when read in connection with the accompanying drawings in which one embodiment of the invention is illustrated by way of example.

In the drawings:

Figure 1 is a longitudinal sectional view of a conduit in which the novel valving arrangement is incorporated; and Figure 2 is a fragmentary view in end elevation of the same structure as viewed from the left-hand end of Figure 1.

In the illustrated embodiment of the invention the valving installation is designated generally by the reference numeral 10 and is seen to comprise a generally tubular housing 11 which is incorporated in a fluid conveying line, the nipples 12 and 13 being coupled into the line, the nipple 12 being the normal inlet end of the device and the nipple 13 constituting normally the outlet end thereof, although within the aims and purposes of the present invention, provision is made for reversal of flow from the nipple 13 toward the nipple 12 upon certain occasions. The enlarged portion 10 of the installation contains a co-axial inserted hollow body 15 and the generally annular passageway 16 around this body is preferably of the same cross-sectional area as that of the conduit or pipe line and of the nipples 12 and 13.

The inserted body 15 comprises a rather irregularly shaped casting 18 to which the hollow forwardly disposed casing 19 is secured by means of the screws 20.

The forward end of the member 19 is bevelled to provide a frusto-conical configuration as at 23 and a web or partition 25 provides the forward wall of the chamber 26 contained within the member 19. One or more openings 27 are provided in the wall 25, and axially of the wall or partition 25 there is formed a hollow boss or tubular guide portion 28 within which is fixed a bushing 29 within which is guided the hollow stem 30 of the conical main valve member 32. This main valve member is provided with a skirt 33 about which is disposed a resilient packing or sealing ring 35 held in place by the wedging annulus 36. The skirt 33, when the main valve 32 is retracted toward the left in Figure 1, may slide upon the outer surface of the projecting boss member 28.

Within the pressure chamber 26 the end portion of the tubular valve stem 30 is provided with a piston element 40, this element being secured in place by means of the threaded cap 41 and the washer 42. The cap 41 has a restricted opening axially thereof as indicated at 43. Suitable packing devices indicated generally at 45 surround the piston member 40 and may include the flexible or resilient packing ring 46 and the packing discs or fins 47 held in place by the discs 48. The fins 47 are disposed in rather close contact with the inner wall of the chamber 26 and the packing element 46 abuts the rear surface of the front end portion of the member 19 when the main valve 32 is in its extreme forward position. The valve and piston assembly 32, 40 is urged toward its outwardly projected position toward the right as shown in Figure 1 by means of the coil spring 50 which seats against the rear surface of the piston 40 and within the shouldered portion 52 of the casting 18.

The hollow bore 31 of the main valve stem 30 is continually in communication with the inlet passageway of the installation by means of the narrow opening 31A.

The pressure chamber 26 is extended toward the left as at 53 and a passage 54 leads to a pilot valve device indicated generally by the numeral 55. A valve seat element 56 having a narrow central bore and a concave conical outer end receives a ball valve 58 which is backed up by a plate 59 having a concavity within which the ball valve member 58 may be received. A radial passageway 60 leads from the chamber of the pilot valve 55 to an axial bore 61 directed toward the normal outlet nipple 13 of the device. The plate 59 serves as an armature for the solenoid or electromagnet 65 and the coil spring 66 serves to normally urge the plate 59 downwardly toward valve closing position. Upon energizing the magnet 65 the valve control plate 59 is retracted and the ball valve 58 unseated, permitting restricted flow through the passage system 53, 54, 60, 61. The magnet or solenoid 65 is supplied with flanges which facilitates it retention and sealing in the cavity which it occupies in the casting 18. A locking ring 67 holds the device in place and the O-ring 68 provides and adequate seal.

Although any suitable details of construction and assembly of the device may be resorted to, the assembly may most economically be effected by welding and bolting the parts together. For example, an annular plate 70 is welded as at 71 to the nipple 13 and this plate is bolted as indicated at 73 in Figure 2 to the body 18, the joint being properly sealed by means of the O-ring or gasket 75. The cylindrical casing element or enclosure 11 may be welded as at 77 to the annular plate 78 and this plate may be bolted as at 79 to the forward face of the flanged portion 80 of the body 18, the connection being sealed by the O-ring 81.

Intermediate the length of the casing 11 an annular enlargement or bulge 83 is provided which contains an O-ring 84 which seals off an internal sleeve 85 which will presently be described. The right-hand end of the casing 11 is flanged as at 86 and welded to the normal inlet nipple 12 as at 87. An annular ring 88 of angle section surrounds the nipple 12 internally of the wall or flange 86 and provides a seat for a spring 89 which presses against a flange formed internally of the movable main valve seat element 90. This seat element has a tapered surface 91 against which the sealing or packing element 35 of the main valve 32 seats when the valve is closed as indicated in Figure 1.

The seating member 90 may slide with relation to the inner sleeve 85 and its sliding movement toward the main valve, that is toward the left in Figure 1, is limited by the abutment shoulder 94 formed on the tubular element 85. An O-ring 95 provides a seal between the seat and the enclosing tubular part 85. The movable seat is provided with a skirt 96 which has a sliding interfit with the inward end of the nipple 12, and the nipple 12 has a fluid orifice 97 which provides communication between the interior of the nipple and the pressure space 98 to the right of the valve seat member 90.

The valve seat member 90 is provided with a bevelled flange 100 which presents a conical surface which in the position shown in Figure 1 is engaged by a latch pin 102 which passes through an opening in a cup-like housing 103 contained within the tubular extension 104 of the main casing 11. A solenoid or electromagnet indicated generally by the reference numeral 105 is seated within the extension 104 being secured therein by means of the snap ring 106 and sealed by means of the O-ring 107. The latch pin 102 is carried by an armature plate 109 which is spaced from the face 110 of the magnet and urged away therefrom by means of the spring 111.

The spring 111 presses the latch pin 102 downwardly and is sufficient, in the absence of energization of the solenoid 110, to retain the main valve seat member 90 in the position shown in Figure 1 wherein it is contacted by the main valve member 32 when the latter is projected to approximately its right-hand limit of movement. In this situation the valve seat member 90 engages the stop shoulder 94 which limits its movement toward the left.

In operation, fluid pressure from the normal inlet nipple 12 would tend to move the main valve 32 away from the seat 90. However, the pressure of the fluid enters the bore 31 of the hollow main valve stem 30 through the passageway 31A and thence passes into the pressure chamber 26 through the restricted opening 43 in the cap 41 and this pressure builds up against the piston assembly 40, 45. The area of the piston arrangement being greater than the area of the main valve 32 itself, the main valve is pressed upon the seating element 90 and the conduit is closed against the passage of fluid from right to left.

If the solenoid control pilot valve 58 is opened, the pressure fluid escapes from the chamber 26 through the channels 53, 54, 60, 61 toward the outlet nipple 13. This relieves the pressure against the piston 40 and the direct pressure of the fluid flow moves the main valve 32 away from its seat 90 and the conical surface of the valve 32 conforms to the surface 23 of the axial inner housing 19 and provides for unobstructed flow through the installation. This flow, however, can be stopped at any time by closing the pilot valve 58 whereupon pressure will build up in the chamber 26 and move the main valve 32 to closed position against the seat 90.

Under certain conditions of operation, it will be desired to afford reverse flow of fluid from the nipple 13 to the nipple 12. Ordinarily such flow would press upon the left-hand side of the main valve 32 and urge it more tightly against the seat element 90 and prevent flow through the device. However, upon energizing the latch controlling device 105, the armature 109 and the latch pin 102 will be withdrawn upwardly away from the flange 100 of the main valve seating element 90 and the fluid pressure against the annular valve seat 90 will move the seat toward the right against the urging of the coil spring 89. This will cause the seat 90 to move away from the main valve 32 and afford an annular passageway for the reverse flow of the fluid. The movement of the main valve 32 toward the right is limited by the abutment of the piston 40 with the inner shoulders of the casing 19, whereby the valve is prevented from following the seat when the latter is retracted.

Under conditions of flow from right to left, the valve seat member 90 will be urged toward the normal position shown in Figure 1 by virtue of pressure fluid passing into the space 98 behind the valve seat, through the opening 97 in the nipple 12. When the seat element 90 abuts the stop shoulders 94 of the sleeve member 85 the latch 102 descends and serves to maintain the valve seat 90 in the position shown in the drawings.

It is understood that various changes and modifications may be made in the embodiment illustrated and described herein without departing from the scope of the invention as defined by the following claims.

Having thus described the invention, what is claimed as new and desired to be secured by Letters Patent is:

1. In a reverse flow valving installation of the class described, a fluid conduit, an annular valve seat in said conduit, a main valve movable in said conduit against the normal direction of flow of fluid in said conduit toward said seat to close the conduit to flow of fluid, a pressure chamber auxiliary to said conduit, a member operatively connected with said main valve and yieldably movable in said pressure chamber under influence of fluid pressure on opposite sides thereof to urge said main valve toward said seat, a passageway affording continual communication between said pressure chamber on the side of said member adjacent said seat and said conduit on the normally downstream side of said main valve, a passageway connecting said pressure chamber on the opposite side of the member with said conduit at a point downstream of said valve in said direction of flow, said opposite side of the member having a greater area exposed to fluid pressure than said main valve, and a pilot valve in said last named passageway normally resiliently urged to closed position and operable at will to relieve the pressure on said movable member to permit said main valve to be unseated by the direct pressure of the fluid against said side of the member adjacent the valve seat.

2. The valving installation as set forth in claim 1 in which said valve seat projects marginally beyond the main valve to have a portion exposed to fluid pressure from the relatively remote or downstream side of said main valve and is movable in said conduit to and from said main valve, and means are provided for yieldingly urging said seat toward a position to be contacted by said valve in closed position of the latter, and for permitting said seat to be retracted away from said valve when subjected to pressure of reverse flow of fluid in said conduit.

3. The valving installation as set forth in claim 1 in which said valve seat projects marginally beyond the main valve to have a portion exposed to fluid pressure from the relatively remote or downstream side of said main valve and is movable in said conduit to and from said main valve, means normally subjecting said seat member to fluid pressure from the upstream side of the valve in said direction of flow to maintain said seat in position to be contacted by said valve in closed position of the latter, the valve seat itself being subject to direct pressure of fluid when the flow of fluid in said conduit is reversed, to urge said seat away from said valve in the direction to permit reverse flow past said valve.

4. The valving installation as set forth in claim 3 in which a stop abutment is provided limiting the movement of said annular valve seat toward said main valve thus establishing its normal position for operation under the first described conditions of flow.

5. The valving installation as set forth in claim 4 in which stop means are provided for limiting the movement of said main valve in the direction toward said seat to a point only slightly beyond the normal position of said seat for the first named direction of flow, whereby under reverse flow the main valve will not continue to follow the retraction of said seat.

6. The valving installation as set forth in claim 5 in which a spring is also provided for urging said seat toward the main valve.

7. The valving installation as set forth in claim 3 in which a retractible stop abutment is provided to prevent displacement and retraction of said seat under influence of reverse flow of fluid in the conduit, and means operable at will to retract said abutment to permit the displacement of the valve seat and permit such reverse flow.

8. In a reverse flow valving installation of the class described, a fluid conduit, an annular valve seat member in said conduit; a main valve movable in said conduit against the normal direction of flow of fluid in said conduit toward said seat member to close the conduit to flow of fluid; means for causing said valve to move away from said seat member to permit flow in said direction and for causing movement of said valve toward said valve seat member to close off flow in said direction; means limiting the movement of said valve toward said seat member to prevent it following said seat member when the latter is retracted to permit reverse flow in the conduit, and means defining an annular chamber in said conduit opening toward said main valve, said annular seat member being mounted in said chamber for movement toward and away from said main valve, said chamber having a passage communicating with said conduit on the normal upstream side of said seat member, whereby said fluid pressure in said chamber in the seated condition of said valve will urge the seat member into seating engagement with said valve.

9. The valving installation as set forth in claim 8 in which there is provided means for latching said seat member in its first mentioned limiting position as during normal flow of fluid in said first direction, and means for releasing said latching means at will for accommodating flow of fluid in said reverse direction.

10. The combination of claim 8 wherein said means for causing movement of the main valve comprises means defining a pressure chamber in said conduit on the normal downstream side of and opening toward said valve seat member, a piston movable in said chamber responsive to differential fluid pressures on opposite sides of said piston, the piston being connected to said main valve, the side of said piston adjacent the valve seat member being exposed to the fluid pressure and said conduit on the downstream side of said seat member, said pressure chamber having a passage communicating with said conduit on the upstream side of said seat member, whereby in the closed condition of the valve fluid pressure in said pressure chamber will urge said main valve into operative engagement with said seat member with a force proportional to the fluid pressure force urging said seat member into engagement with the valve.

References Cited in the file of this patent

UNITED STATES PATENTS

| | | |
|---|---|---|
| 845,063 | Desper | Feb. 26, 1907 |
| 1,156,657 | Beam | Oct. 12, 1915 |
| 1,777,060 | Welcker | Sept. 30, 1930 |
| 2,181,523 | Shiels | Nov. 28, 1939 |
| 2,409,517 | Schmit | Oct. 15, 1946 |
| 2,675,824 | Worlidge | Apr. 20, 1954 |
| 2,676,611 | Page | Apr. 27, 1954 |
| 2,681,074 | Frentzel | June 15, 1954 |